(12) United States Patent
Mohl

(10) Patent No.: US 7,996,708 B1
(45) Date of Patent: *Aug. 9, 2011

(54) TECHNIQUES FOR FILE SYSTEM RESOURCE RESTORATION

(75) Inventor: Steven E. Mohl, Sanford, FL (US)

(73) Assignee: Symantec Corporation, Mountain View, CA (US)

( * ) Notice: Subject to any disclaimer, the term of this patent is extended or adjusted under 35 U.S.C. 154(b) by 191 days.

This patent is subject to a terminal disclaimer.

(21) Appl. No.: 12/404,780

(22) Filed: Mar. 16, 2009

(51) Int. Cl.
*G06F 11/00* (2006.01)
(52) U.S. Cl. .......................................................... 714/3
(58) Field of Classification Search .................. None
See application file for complete search history.

(56) References Cited

U.S. PATENT DOCUMENTS

| | | | |
|---|---|---|---|
| 7,328,325 B1 * | 2/2008 | Solis et al. ..................... | 711/202 |
| 7,334,157 B1 * | 2/2008 | Graf et al. ....................... | 714/13 |
| 2009/0089781 A1 * | 4/2009 | Shingai et al. .................... | 718/1 |
| 2009/0222496 A1 * | 9/2009 | Liu et al. ........................ | 707/204 |

OTHER PUBLICATIONS

EMC Home Base, "Truly hardware-independent server protection, migration, and recovery solution for heterogeneous environments," EMC Corporation; 2008; pp. 1-2.

* cited by examiner

*Primary Examiner* — Michael C Maskulinski
(74) *Attorney, Agent, or Firm* — Hunton & Williams LLP

(57) ABSTRACT

Techniques for file system resource restoration are disclosed. In one particular exemplary embodiment, the techniques may be realized as a method for file system resource restoration comprising modeling source configuration information of one or more file system resources associated with a first storage management system, modeling target configuration information of one or more file system resources associated with a second storage management system, mapping one or more portions of the source configuration information to the target configuration information, generating computer executable restoration instructions based at least in part on the mapping; and executing the computer executable restoration instructions to restore one or more file system resources of the source configuration information to a target computing platform identified by the target configuration information.

19 Claims, 3 Drawing Sheets

TECHNIQUES FOR FILE SYSTEM RESOURCE RESTORATION

CROSS-REFERENCE TO RELATED APPLICATIONS

This patent application is related to U.S. patent application Ser. No. 12/124,820, filed May 21, 2008, which is hereby incorporated by reference herein in its entirety.

FIELD OF THE DISCLOSURE

The present disclosure relates generally to file system restoration and, more particularly, to techniques for file system resource restoration.

BACKGROUND OF THE DISCLOSURE

In the event of a system failure, restoration of the system may require restoration of not only data, but also an underlying file system, an operating system, and/or other components. In the event of a system failure caused by a hardware issue, a fire, a flood or other events, it may be necessary to restore an operating system, file system, data, and/or other components to one or more new hardware platforms. Installing an operating system, a file system, and/or other components required for restoration of a failed system on a new system is referred to as a bare metal restore.

Restoration of a file system on a new system may require an identical configuration between the new system and an old system. This restoration may require the availability of identical hardware, which may also need to be configured identically. For example, a file system using a certain level of RAID (Redundant Arrays of Independent Disks) with a certain amount of storage may not be capable of restoration on a different configuration. Additionally, even if an identically configured hardware platform is available, it may be required to first determine a configuration of a failed system. Determining a configuration of a failed system may be difficult to accomplish in an orderly and time effective manner from backups and documentation. Furthermore, certain configurations of failed systems may utilize mirroring, spare disks, and/or other resources. However, it may be cost prohibitive for a company or other entity to maintain an identical configuration on a secondary system.

Additionally, restoration of one or more file system resources on a new system may require the same type of storage management system. For example, if a first file system is managed by a particular logical volume manager, such as a Sun Volume Manager (SVM), the new system may require installation of Sun Volume Manager as part of the restoration.

In view of the foregoing, it may be understood that there may be significant problems and shortcomings associated with current file system restoration technologies.

SUMMARY OF THE DISCLOSURE

Techniques for file system resource restoration are disclosed. In one particular exemplary embodiment, the techniques may be realized as a method for file system resource restoration comprising modeling source configuration information of one or more file system resources associated with a first storage management system, modeling target configuration information of one or more file system resources associated with a second storage management system, mapping one or more portions of the source configuration information to the target configuration information, generating computer executable restoration instructions based at least in part on the mapping, and executing the computer executable restoration instructions to restore one or more file system resources of the source configuration information to a target computing platform identified by the target configuration information.

In accordance with other aspects of this particular exemplary embodiment, the first storage management system and the second storage management system may be dissimilar.

In accordance with further aspects of this particular exemplary embodiment, the source configuration information may be associated with a Veritas Volume Manager and the target configuration information may be associated with a different storage manager.

In accordance with additional aspects of this particular exemplary embodiment, the target configuration information may be associated with one of: Sun Microsystems ZFS, AIX Native Logical Volume Manager, and HPUX Native Logical Volume Manager.

In accordance with additional aspects of this particular exemplary embodiment, the target configuration information may be associated with a Veritas Volume Manager and the source configuration information may be associated with a different storage manager.

In accordance with additional aspects of this particular exemplary embodiment, the source configuration information may be associated with one of: Sun Microsystems ZFS, AIX Native Logical Volume Manager, and HPUX Native Logical Volume Manager.

In accordance with additional aspects of this particular exemplary embodiment, the execution of the computer executable restoration instructions may enable an unmanaged slice based disk to be converted to a managed ZFS disk.

In accordance with additional aspects of this particular exemplary embodiment, the method for file system resource restoration may provide an interface for manipulation of target configuration information to enable restoration to a target computing platform which may be different from a computing platform associated with source configuration information.

In accordance with additional aspects of this particular exemplary embodiment, the manipulation of target configuration information may enable the mapping between a dissimilar source configuration and target configuration including at least one of: mapping a mirrored configuration to an un-mirrored configuration, mapping a striped configuration to an unstriped configuration, mapping between different levels of RAID configurations, and mapping between a configuration with spare storage to a configuration without spare storage.

In accordance with additional aspects of this particular exemplary embodiment, modeling configuration information may comprise parsing configuration information and a parsed configuration may be represented as configuration objects.

In accordance with additional aspects of this particular exemplary embodiment, the configuration objects may represent file system components stored in a hierarchical order.

In accordance with additional aspects of this particular exemplary embodiment, the hierarchal order of a model of file system objects in a source configuration may facilitate the restoration of resources on a target computing platform.

In accordance with additional aspects of this particular exemplary embodiment, the hierarchical order of a model of file system objects in a source configuration may enable a restoration program to traverse a hierarchical tree from lower level objects to higher level objects to generate executable code to restore a configuration.

In accordance with additional aspects of this particular exemplary embodiment, the method for file system resource restoration may include performing error handling during the execution of restoration instructions.

In accordance with additional aspects of this particular exemplary embodiment, the method for file system resource restoration may include storing one or more configurations.

In accordance with additional aspects of this particular exemplary embodiment, the techniques may be realized as at least one processor readable medium for storing a computer program of instructions configured to be readable by at least one processor for instructing the at least one processor to execute a computer process for performing the method as recited in claim 1.

In another particular exemplary embodiment, the techniques may be realized as an article of manufacture for file system resource restoration. The article of manufacture may comprise at least one processor readable carrier, and instructions carried on the at least one carrier. The instructions may be configured to be readable from the at least one carrier by at least one processor and thereby cause the at least one processor to operate so as to model source configuration information of one or more file system resources associated with a first storage management system, model target configuration information of one or more file system resources associated with a second storage management system, map one or more portions of the source configuration information to the target configuration information, generate computer executable restoration instructions based at least in part on the mapping, and execute the computer executable restoration instructions to restore one or more file system resources of the source configuration information to a target computing platform identified by the target configuration information.

In yet another particular exemplary embodiment, the techniques may be realized as a system for file system resource restoration comprising one or more processors communicatively coupled to a server. The server may be configured to model target configuration information of one or more file system resources associated with a second storage management system, map one or more portions of the source configuration information to the target configuration information, generate computer executable restoration instructions based at least in part on the mapping, and execute the computer executable restoration instructions to restore one or more file system resources of the source configuration information to a target computing platform identified by the target configuration information.

In accordance with other aspects of this particular exemplary embodiment, the source configuration information and the target configuration information may utilize dissimilar storage management systems.

In accordance with further aspects of this particular exemplary embodiment, the source configuration information may be associated with a Veritas Volume Manager and the target configuration information may be associated with a different storage manager.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
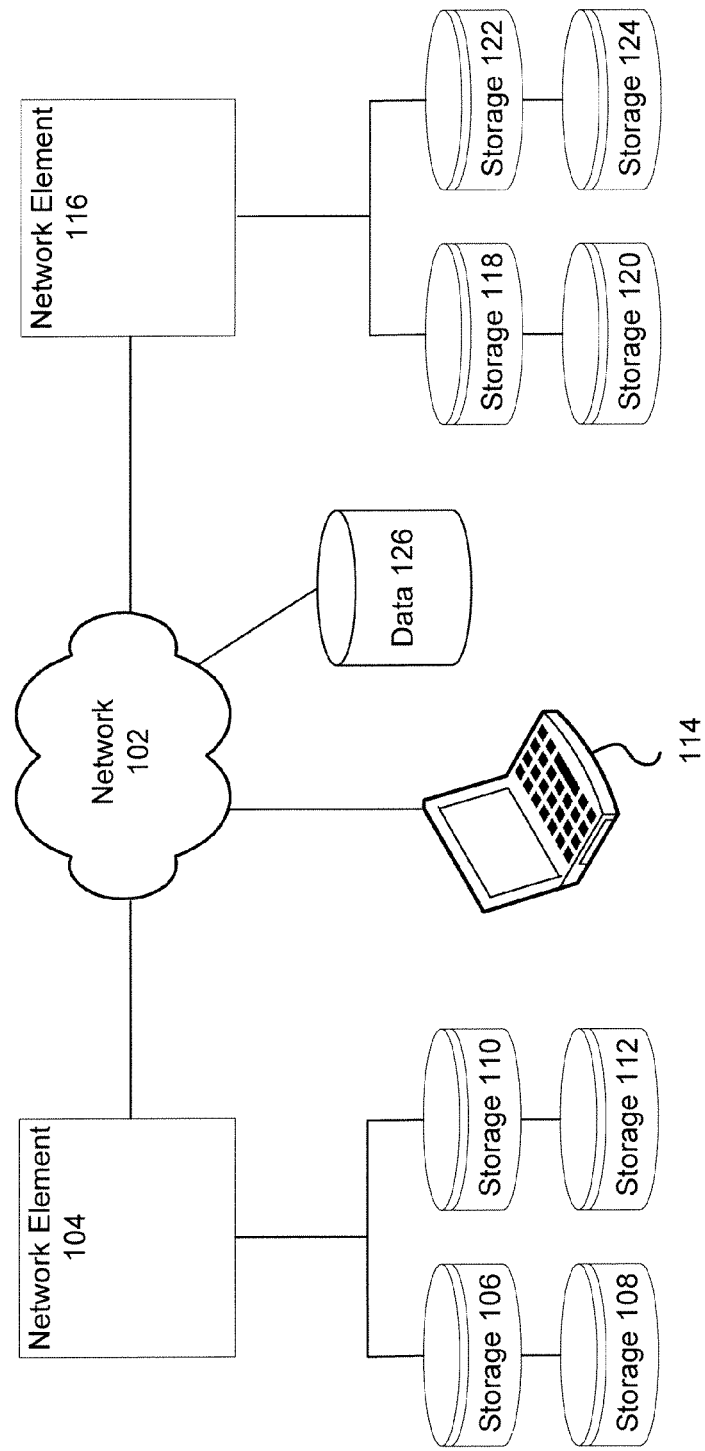
FIG. 1 shows a system for file system resource restoration in accordance with an embodiment of the present disclosure.

Referring to FIG. 1, there is shown a system 100 for file system resource restoration in accordance with an embodiment of the present disclosure. FIG. 1 is a simplified view of system 100, which may include additional elements that are not depicted. In system 100, network elements 104 and 116 may be communicatively coupled to network 102. Network element 104 may be communicatively coupled to storage 106, 108, 110, and 112. Network element 116 may be communicatively coupled to storage 118, 120, 122, and 124. Computer 114 may be communicatively coupled to network 102. Storage 126 may be communicatively coupled to network 102.

Network 102 may be a local area network (LAN), a wide area network (WAN), the Internet, a cellular network, a satellite network, or another network that permits communication between network elements 104 and 116, and other devices communicatively coupled to network 102.

Network elements 104 and 116 may be application servers, backup servers, network storage devices, or other devices communicatively coupled to network 102. Network elements 104 and 116 may utilize storage 106, 108, 110, 112, 118, 120, 122, and 124 for the storage of application data, backup data, or other data.

Storage 106, 108, 110, 112, 118, 120, 122, and 124 may be local, remote, or a combination thereof to network elements 104 and 116. Storage 106, 108, 110, 112, 118, 120, 122, and 124 may utilize, for example, RAID, striped disks, hot spare disks, tape, or other network accessible storage. In one or more embodiments, storage 106, 108, 110, 112, 118, 120, 122, and 124 may be, for example, a storage area network (SAN), an internet small computer systems interface (iSCSI) SAN, a Fibre Channel SAN, a Common Internet File System (CIFS), Network Attached Storage (NAS), or a Network File System (NFS).

Storage 126 may be network accessible storage and may be local, remote, or a combination thereof to network elements 104 and 116. Storage 126 may utilize tape, disk, a storage area network (SAN), or other computer accessible storage. In one or more embodiments, storage 126 may represent a database, which may be utilized to store one or more file system configurations. Storage 126 may use a relational methodology, flat files, an object oriented methodology or other methodologies to represent one or more file system configurations or other data. Storage 126 may utilize a combination of methodologies. For example, storage 126 may store information about components of one or more file system configurations which may be represented as objects. The relationship between these objects may be modeled in a normalized manner and stored in a relational database. The relationship between entities as modeled in storage 126 may reflect a parent/child, or a lower level to a higher level software component, or a higher level to lower level software component relationships. For example, a first entity, table, or storage object may represent a host. A second entity may represent a storage device. There may be multiple storage devices modeled for a single host object. Another entity may represent a storage abstract data type such as a volume, a partition, a file system, a logical drive, a slice, a plex, a subdisk, a disk group, a storage pool, or another storage abstract data type. The entities utilized in a model, as well as the relationships between the entities in a model, may depend upon a type or configuration of file system model stored in storage 126. Storage 126 may be utilized to store storage object configuration information and storage object relationships, as well as information about one or more storage objects. For example, a model stored in storage 126 modeling one or more ZFS file systems may contain information about a number of file systems to a storage pool, a number of volumes to a storage pool, a number of devices to a storage pool, a number of slices to a storage device, or other storage object relationships. A model stored in storage 126 may also reflect storage configuration details such as, for example, a RAID level, striping, concatenation, and mirroring. Storage 126 may contain configuration information about objects such as whether a disk or other storage device is a spare device. In another example, a model stored in storage 126 may contain one or more objects, such as objects based on different classes in a hierarchy of objects representing a Veritas Volume Manager (VxVM) managed file system. Such objects may include objects representing physical disks, logical disks, disk groups, volumes, subdisks, and plexes. Other objects may represent storage manager independent configuration items such as a mount point, a file system, and a host.

In one or more embodiments, file system configurations may be modeled utilizing entities representing high level file system object types. These entities may be utilized to store parent classes. One or more child entities may be linked to a parent entity and may be utilized to store subclasses. An entity linked to a child entity may utilize name/value pairs or other structures to store attributes of a subclass.

In one or more embodiments, storage 126 may utilize a hierarchical storage system to model one or more file system configurations. In some embodiments, a file system configuration may be stored as a flat file utilizing storage 126.

Storage of a modeled configuration in storage 126 may enable a process to logically navigate the model in order to generate restoration code. For example, a model may be structured such that a process may iteratively navigate from a lowest level to a highest level of a model while generating restoration code. This may enable the restoration code to be written in an order that the restoration code executes, either sequentially and/or parallel, such that lower level system resources may be created and/or configured prior to higher level resources which may depend upon them. Elements of a model which are at a same level, may, in some embodiments, be created and/or configured in parallel. For example, multiple logical disks may be created in parallel.

In some embodiments, storage 126 may model resources such as network resources, host resources, software resources, licensing information, network configuration information, operating system information, and other details. Resource information modeled in storage 126 may facilitate bare metal restoration of one or more systems.

In one or more embodiments, business rules, constraints, triggers, or other data integrity devices may be utilized. Rules may ensure that a modeled configuration complies with file system limitations or constraints, device constraints, formatting constraints, business rules, or other data integrity logic. For example, logic contained on storage 126, on computer 114, or on another device may determine that a modeled configuration may require a certain number of associated storage devices before the configuration may be depicted as complying with a particular RAID level. In one or more embodiments, a configuration may be depicted as configured for a particular RAID level, but may display an error indicating that the configuration requires additional associated storage devices.

Storage 126 may store logic for mapping modeled configurations to target platforms, logic for editing modeled configurations, logic for parsing received network element data, logic for modeling network element data, logic for providing a user interface, logic for implementing stored configurations, and other logic.

Storage 126 may also store mapping tables, translation tables, or other data structures enabling the mapping of one or more file system resources from one hardware platform to a different hardware platform, one operating system to a different operating system, one storage manager to a different storage manager, and/or between unmanaged and managed storage. Mapping tables may contain logic to ensure that required attributes or settings are configured when restoring across platforms, storage managers, disk configurations, or across other dissimilar environments. In one or more embodiments, storage 126 may contain default settings for one or more attributes associated with an operating system and/or a storage management system.

In one or more embodiments a model may be created and stored in memory, such as in memory of computer 114.

Computer 114 may be a desktop computer, a laptop computer, a server, or other computer capable of system resource analysis. Computer 114 may receive data from user input, a network management system, a network provisioning system, a management information base, a database, a file, a web service, and/or an application programming interface. Computer 114 may query other systems and/or local or remote storage such as data storage 126, network elements 104 and 116, and storage 106, 108, 110, 112, 118, 120, 122, and 124 to obtain network information.

In one or more embodiments, computer 114 may serve as a user terminal for an administrator or other user enabling the restoration of one or more file system resources. In some embodiments, computer 114 may represent a server or other network element capable of querying one or more hosts, network storage, or other network accessible elements to determine system resources, configuration data, and other details. Computer 114 may gather or receive network resource information in one or more formats. For example, computer 114 may receive information about a host via application programming interfaces (APIs), interface tables, remote procedure calls (RPCs), web services, Extensible Markup Language (XML) based interfaces, Simple Object Access Protocol (SOAP) based interfaces, and other interfaces for sending or receiving network element resource and configuration information. Computer 114 may parse received information and may store the information as part of a model. In one or more embodiments, computer 114 may receive a snapshot or other backup of a host and may parse one or more backups to determine a host configuration. Computer 114 may generate one or more commands or instructions to build, configure, recover, and/or restore one or more network resources. Computer 114 may utilize one or more tools or utilities to query network resources, model network resources, and/or restore network resources. Computer 114 may utilize storage 126 to store received information, one or more models, code for restoration of one or more systems, and other data.

Discovery of a configuration may occur in several ways. For example, a user may utilize computer 114 to discover a configuration. In this example, a user may specify the network address of a computing platform and computer 114 may receive configuration information and/or retrieve configuration information for that computing platform. Discovery may also be performed when a restoration is occurring. If a configuration of a target platform does not match a modeled target configuration, a user may be prompted by an error handling routine of the restoration code. The user may utilize computer 114 to rediscover the target configuration, remap a stored configuration to a target configuration, regenerate restoration code and/or otherwise address the inconsistencies.

Computer 114 may also verify that a computing platform is configured correctly to accommodate a target modeled configuration. Computer 114 may detect problems with a discovered configuration and/or generate restoration code which may handle errors or constraints when the restoration code executes on a restoring client. For example, computer 114 may detect that a configuration has disk labels that are incompatible with a file system configuration. If a ZFS (Zettabyte File System) file system is to be restored to a computing platform, computer 114 may verify that disk labels of a configuration are formatted as EFI (Extensible Firmware Interface) labeled disks. Computer 114 may generate restoration code that may verify one or more disk labels of a target platform and/or a restoring client when the restoration code executes on the target platform. Restoration code generated by computer 114 may provide a prompt or an error to a user if an incompatible disk label is detected. Computer 114 may generate restoration code to execute on a target platform which may enable a user to re-label disk labels in a configuration as EFI (Extensible Firmware Interface) labeled disks or SMI (Sun Microsystems, Inc) labeled disks. Computer 114 may enable the enforcement of configuration constraints, business rules, or other constraints. For example, computer 114 may verify that adequate space exists for a configuration prior to restoration. In one or more embodiments, constraint verification, business rules and other logic may be applied in reference to a target configuration and thus may enable a target configuration that may not comply with constraints applied to a source configuration (e.g., a target configuration using VxVM storage management may conform with rules that are associated with VxVM and may not comply with rules that are associated with its source configuration on a ZFS managed system). In one or more embodiments, a source configuration and a target configuration may conform with and/or apply the same rules, constraints, and/or logic.

Computer 114 may provide a user interface enabling a user to view data related to one or more network resources such as a configuration of a host file system. Computer 114 may be a web server or other server providing an interface for one or more remote users. Computer 114 may enable a user to view actual or modeled resources. Computer 114 may enable a user to map modeled resources onto actual resources. For example, computer 114 may enable a user to map a configuration of a previous modeled host system to a second computing platform. This may enable a user of computer 114 to restore a configuration of a modeled system to a second host or computing platform. In one or more embodiments, the mapping process may enable a user to ensure that a second computing platform contains sufficient resources to accommodate a modeled configuration. In some embodiments, an interface provided by computer 114 may provide an error message if a second computing platform is incompatible or contains insufficient resources, such as disk space, to accommodate a modeled configuration. In one or more embodiments, an interface provided by computer 114 may enable a user to modify a modeled configuration to accommodate a second computing platform. For example, computer 114 may enable a user to map a modeled configuration of a mirrored file system to an unmirrored file system. This may enable the restoration of a mirrored file system of a failed host to an unmirrored file system on a second host when the second host has insufficient resources for mirroring. Computer 114 may enable mapping between mirrored configurations and unmirrored configurations, mapping between striped configurations and unstriped configurations, mapping between different levels of RAID configurations, and mapping between configurations with spare storage and without spare storage. Computer 114 may enable the mapping of a configuration to a system with greater or fewer resources. For example, a configuration may be edited to add mirroring or spare disks prior to restoration on a target or secondary system.

In one or more embodiments, computer 114 may enable the mapping of a configuration on a source system associated with a first storage management system to a configuration on a new system associated with a second storage management system. The source configuration may be associated with a Veritas Volume Manager and the target configuration may be associated with a different storage manager, such as, for example, Sun Microsystems ZFS, AIX Native Logical Volume Manager, or HPUX Native Logical Volume Manager. In another example, the source configuration may be associated with storage manager, such as, for example, Sun Microsystems ZFS, AIX Native Logical Volume Manager, or HPUX Native Logical Volume Manager and the target configuration may be associated with a Veritas Volume Manager.

Computer 114 may utilize one or more objects and/or methods associated with objects to enable a mapping between a source configuration associated with one storage management system and a target configuration associated with a second storage management system. For example, computer 114 may enable the mapping of a configuration managed by a ZFS storage manager to a configuration associated with a Veritas storage manager. Computer 114 may generate executable computer code for restoration by mapping ZFS objects in a hierarchy to VxVM associated objects in a hierarchy and then using the target configuration reflecting the mapped hierarchy as a basis for generating executable code for restoration. For example, computer 114 may map one or more VxVM associated objects by calling an add method for a physical disk object, an add method for a VxVM logical disk object (associated with the added physical disk), and an add method for a VxVM disk group (associated with the logical disk object). Computer 114 may also map one or more attributes of the source configuration ZFS storage pool to the target configuration VxVM disk group. In some embodiments, computer 114 may map a base set of attributes enabling the subsequent restoration of a file system associated with a ZFS storage manager to a target system with a file system managed by a Veritas storage manager. After restoration a user may edit a configuration to set additional attributes. In one or more embodiments, all attributes in a source configuration which have equivalent attributes in a target configuration may be mapped. For example, one or more tables or other data structures may map attributes from a configuration associated with a first storage manager to a configuration associated with a second storage manager. A default setting may be provided for one or more attributes in a target configuration in the event that an equivalent attribute does not exist or is not set in a source configuration. In one or more embodiments, a user may be prompted to specify one or more settings in a target configuration. The prompt may include information from a source configuration, such as attribute settings, and may also include allowable and/or suggested settings for a target configuration.

In some embodiments, a single hierarchy may be implemented with abstract classes representing general levels of a source and/or a target system. For example, classes may include a physical disk class with subclasses for different physical disk types, a logical storage element class with different subclasses (e.g., virtual device subclass, logical disk subclass, etc.), a logical volume class with different subclasses (e.g., a storage pool subclass, a disk group subclass, etc.), and other abstract classes for hosts, operating systems, file systems, mount points, etc. Of course different classes implementations enabling abstractions of one or more storage management systems, disk arrangements (e.g., RAID, concatenated, etc.), file systems, operating systems, and/or hardware are possible. In these embodiments, restoration code may utilize classes and/or subclasses appropriate to a target configuration.

In one or more embodiments, computer 114 may enable the restoration of one or more file system resources from an unmanaged (i.e., no storage manager is utilized) to a managed file system or from a managed to an unmanaged file system (e.g., the restoration target is not running a storage manager because of a lack of resources). For example, a source configuration may be based on a Sun Solaris host with a boot disk which is unmanaged and slice based (i.e., partitioned into slices as a contiguous ranges of blocks on disk). Computer 114 may enable the generation of executable restoration code which may map the unmanaged slice based disk to a ZFS managed disk without requiring additional storage space. For example, the target configuration may be restored on the same platform as the source configuration effectively enabling an existing system to be converted from an unmanaged file system to file system managed by ZFS, Veritas storage manager, or another storage manager system. In the example above, it may be possible to convert an unmanaged slice based disk to a ZFS managed disk without requiring additional disk storage (i.e., without setting up a second disk that is ZFS managed and copying files from the slice based disk to the ZFS managed disk).

In one or more embodiments, computer 114 may enable the generation of executable restoration code that enables the restoration of one or more file system resources associated with a hardware platform to a different hardware platform associated with a second file system. For example, Veritas Volume Manager (VxVM) may be compatible with multiple hardware platforms and operating systems including, but not limited to, Sun Solaris operating systems, Sun hardware, HPUX (Hewlett Packard Unix), Hewlett Packard (HP) hardware, Red Hat Linux, Red Hat compatible hardware (e.g., Intel based systems), Microsoft Windows operating systems, and Windows compatible hardware (e.g., Intel based systems). Computer 114 may be capable of generating restoration code that enables the mapping of one or more file systems resources on a first hardware platform such as an HP platform using HPUX to a target platform using Solaris on Sun hardware. The executable restoration code may enable a bare metal restore on the different hardware platform for one or more file system resources. The executable restoration code may enable one or more system resources, such as disk groups, volumes, file systems, and/or mount points to be restored on a target system utilizing a similar storage manager, such as Veritas Volume Manager. In one or more embodiments, executable restoration code may be generated enabling the bare metal restoration across hardware platforms, operating systems, and/or storage managers. For example, executable restoration code may be generated to restore from a source configuration on a HP hardware platform running HPUX and managed by HPUX Native Logical Volume Manager to a target configuration on a Sun hardware platform running Solaris with a file system managed by ZFS.

Figure 2:
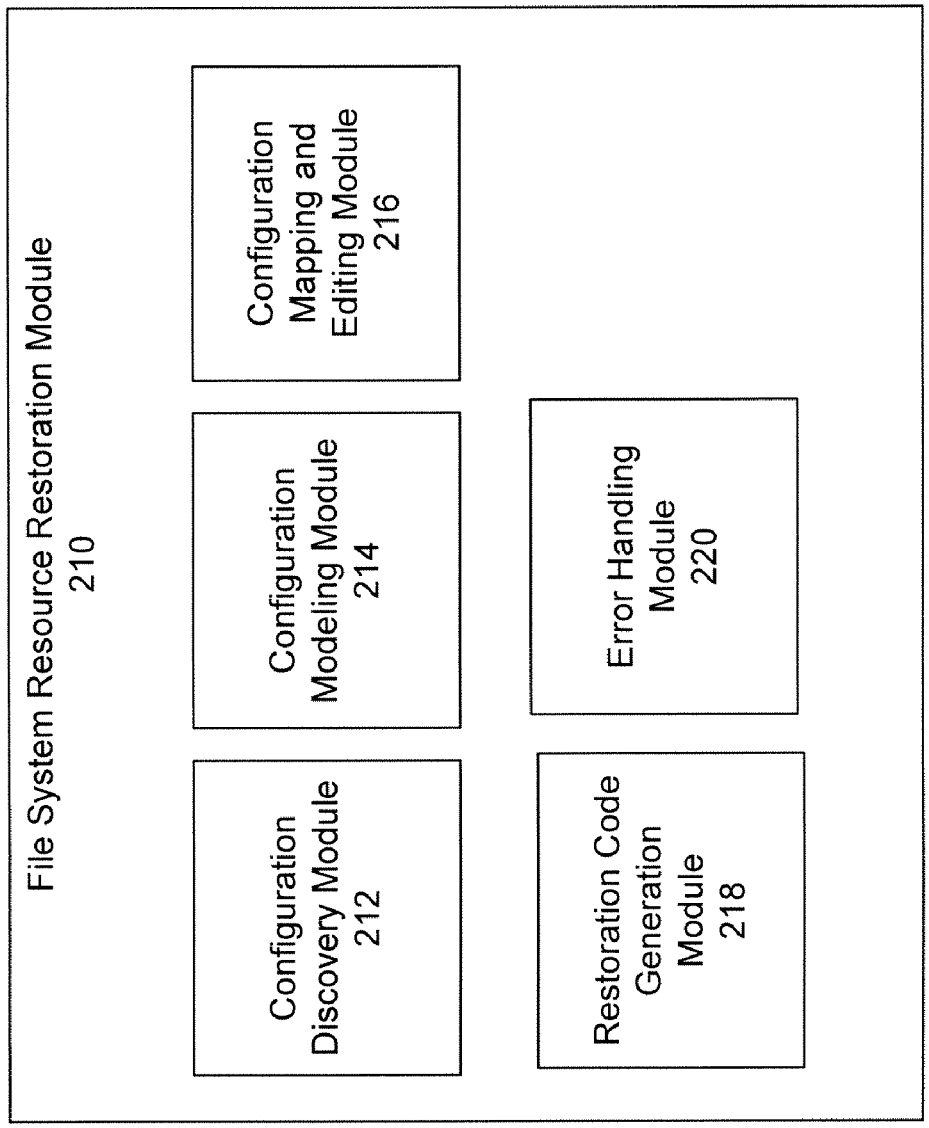
FIG. 2 shows a module for file system resource restoration in accordance with an embodiment of the present disclosure.

Referring to FIG. 2, there is shown a module 210 for restoration of file system resources in accordance with an exemplary embodiment of the present disclosure. As illustrated in FIG. 2, file system resource restoration module 210 may contain one or more components, including configuration discovery module 212, configuration modeling module 214, configuration mapping and editing module 216, restoration code generation module 218, and error handling module 220.

Configuration discovery module 212 may receive, query, or retrieve network resource information. For example, configuration discovery module 212 may receive information, such as a snapshot, which may contain information related to a configuration to be modeled.

Configuration modeling module 214 may utilize information received by configuration discovery module 212 to model one or more computing platform configurations. Configuration modeling module 214 may parse received information and may represent information in a standardized format. For example, configuration modeling module 214 may parse received information, such as a snapshot, model a configuration of a file system, and store it. The model may be stored in a hierarchical manner, in a normalized relational manner, according to an object oriented methodology, according to other methodologies, or according to a combination of methodologies.

Configuration mapping and editing module 216 may enable the mapping of a modeled configuration to a platform. For example, a modeled file system may be mapped to a second platform so that a modeled storage device, such as a disk of the modeled file system, may be mapped to an available storage device, such as a disk on the second platform. Configuration mapping and editing module 216 may enable the editing of a configuration. For example, configuration mapping and editing module 216 may enable the editing of a modeled configuration to match resources of an available computing platform. For example, a user may utilize configuration mapping and editing module 216 via an interface, to change a RAID level of a configuration or to eliminate mirroring. This may enable a stored configuration of a failed host to be restored on a secondary host with fewer available resources. Configuration mapping and editing module 216 may enable the mapping of a modeled configuration to a different storage management system, a different disk configuration, a different hardware platform, and/or a different operating system. Configuration mapping and editing module 216 may map from file system resources of a first storage management system to file system resources of a second storage management system. For example, configuration mapping and editing module 216 may enable the calling of an add method associated with a VxVM disk group object to add a VxVM disk group to target configuration from a modeled ZFS storage pool source configuration. Configuration mapping and editing module 216 may map attributes across storage managers, may set defaults, or provide other configuration using stored logic, mapping tables, and/or other data. In one or more embodiments, configuration mapping and editing module 216 may prompt a user to enter settings or attribute values.

Restoration code generation module 218 may utilize a modeled configuration, user input, and/or other data to generate code for restoring a modeled configuration. In one or more embodiments, restoration code generation module 218 may enable bare metal restoration of one or more systems, file systems, or other networked resources. Restoration code generation module 218 may enable the generation of code to create a VxVM disk group object as part of a target configuration restoring from a modeled ZFS storage pool source configuration. Restoration code generation module 218 may generate executable code to set attributes for a storage manager, set default values, or set other configuration using stored logic, mapping tables, and/or other data. In one or more embodiments, restoration code generation module 218 may generate executable code which may prompt a user during execution of the code to enter one or more settings or attribute values.

Error handling module 220 may enable the trapping and handling of one or more errors. For example, error handling module 220 may enable the trapping of a mapping error which may occur if an attempt is made to map a modeled configuration to a computing platform with insufficient or incompatible resources. Error handling module 220 may prompt a user with an error message, and may enable a user to utilize configuration mapping and editing module 216 to address a source of an error. In another example, error handling module 220 may enable a user or a process to retry execution of restoration code. This may enable a restoration of a modeled configuration if, for example, a target system was offline during an initial restoration attempt.

Figure 3:
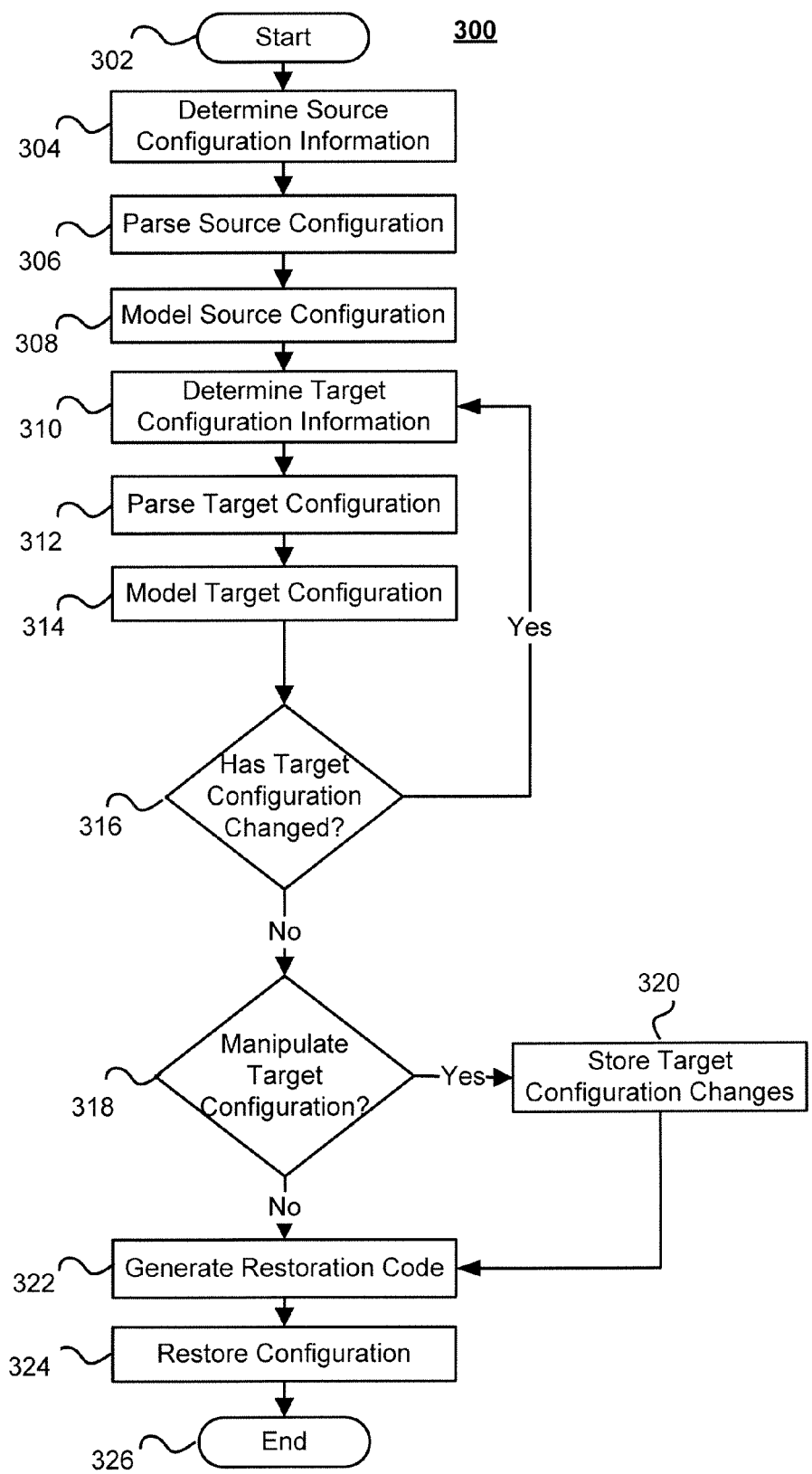
FIG. 3 depicts a method for file system resource restoration in accordance with an embodiment of the present disclosure.

Referring to FIG. 3, there is shown a method 300 for restoration of file system resources in accordance with an embodiment of the present disclosure. At block 302, the method may begin.

At block 304, the method may determine source configuration information. For example, data may be received or retrieved, which may enable the modeling of a source system, source computing platform, or a source file system.

At block 306, the source configuration information may be parsed. For example, a snapshot of a source configuration may be parsed to identify one or more necessary configuration details.

At block 308, a source configuration may be modeled. This may enable a user to view a source configuration and the relationships between one or more source configuration components.

At block 310, a target configuration of a target computing platform may be determined. In one or more embodiments, this may utilize software and/or hardware similar to block 304.

At block 312, the target configuration may be parsed. This may utilize software and/or hardware similar to block 306.

At block 314, the target configuration may be modeled. This may utilize software and/or hardware similar to block 308. In one or more embodiments, block 314 may enable the mapping of a modeled configuration to a different storage management system, a different disk configuration, a different hardware platform, and/or a different operating system.

At block 316, the method may determine whether the target configuration has changed. This may enable storing of a source configuration and a target configuration in advance of utilizing the configurations. For example, an administrator may utilize the method to model the resources and configuration of a production host and the resources and configuration of a secondary or backup host. This may also enable generation of restoration code enabling mapping of a modeled configuration to a different storage management system, a different disk configuration, a different hardware platform, and/or a different operating system. If the secondary host changes prior to a restoration, at block 316, the method may enable detection of the change and may prevent incompatibilities that could cause errors in a restoration process. For example, a discovery process may be run prior to generation of restoration code. The discovery process may verify a modeled target configuration. If a target configuration has changed, the method may continue at block 310. If a target configuration has not changed, the method may continue at block 318.

At block 318, the method determine whether a target configuration requires manipulation. In one or more embodiments, the method may prompt a user with a selection through a user interface. In one or more embodiments, the method may follow rules, constraints, or other logic to make adjustments to a target configuration. In one or more embodiments, the method 300 may utilize mapping tables, translation tables, default settings tables, other data structures, and/or mapping logic to enable the mapping of a modeled configuration to a different storage management system, a different disk configuration, a different hardware platform, and/or a different operating system. For example, attributes of a first storage manager, such as ZFS, may be mapped to a second storage manager, such as VxVM. If a target configuration is changed, the method may continue at block 320. If a target configuration is unchanged, the method may continue at block 322.

At block 320, target configuration changes may be stored to a model of the target configuration. Target configuration changes may reflect adaptations to a source configuration model made to accommodate or to take advantage of a target configuration platform.

At block 322, the method may generate restoration code which may enable restoration of a source configuration on a target computing platform. Restoration code may be generated by navigating a model of a target configuration and producing executable code to restore one or more components of the target configuration. In one or more embodiments, during the navigation of a hierarchy, equivalent structures in another hierarchy may be identified and invoked to enable mapping across different environments associated with file system resources. For example, a VxVM logical disk may be mapped to a ZFS logical device as part of a ZFS storage pool to be restored on a target configuration.

At block 324, the method may execute the restoration code to restore a configuration of a source system to a target system. The restoration code may utilize one or more scripts, utilities, and/or tools.

At block 326, the method may end.

During execution of restoration code, the code may detect errors and handle errors. In some embodiments, one or more errors may be determined to be a result of a changed and/or inconsistent target configuration. Rediscovery of a target configuration, labeling of disks of a target configuration, regeneration of one or more portions of restoration code, retrying of a failed restoration command and/or other measures may be taken. In some embodiments, one or more measures may be taken automatically in response to an error. In one or more embodiments, a user may be prompted and allowed to input a desired action in response to an error.

At this point it should be noted that file system resource restoration in accordance with the present disclosure as described above typically involves the processing of input data and the generation of output data to some extent. This input data processing and output data generation may be implemented in hardware or software. For example, specific electronic components may be employed in generating executable code for file system resource restoration or similar or related circuitry for implementing the functions associated with mapping source configuration information to a computing platform identified by the target configuration information in accordance with the present disclosure as described above. Alternatively, one or more processors operating in accordance with instructions may implement the functions associated with file system resource restoration in accordance with the present disclosure as described above. If such is the case, it is within the scope of the present disclosure that such instructions may be stored on one or more processor readable media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for file system resource restoration comprising:
    modeling source configuration information of one or more file system resources associated with a first storage management system;
    modeling target configuration information of one or more file system resources associated with a second storage management system;
    mapping one or more portions of the source configuration information to the target configuration information, wherein the first storage management system associated with the source configuration and the second storage management system associated with the target configuration are dissimilar;
    generating computer executable restoration instructions based at least in part on the mapping; and
    executing the computer executable restoration instructions to restore one or more file system resources of the source configuration information to a target computing platform identified by the target configuration information.

2. The method of claim 1, wherein the source configuration information is associated with a Veritas Volume Manager and the target configuration information is associated with a different storage manager.

3. The method of claim 2, wherein the target configuration information is associated with one of: Sun Microsystems ZFS, AIX Native Logical Volume Manager, and HPUX Native Logical Volume Manager.

4. The method of claim 1, wherein the target configuration information is associated with a Veritas Volume Manager and the source configuration information is associated with a different storage manager.

5. The method of claim 4, wherein the source configuration information is associated with one of: Sun Microsystems ZFS, AIX Native Logical Volume Manager, and HPUX Native Logical Volume Manager.

6. The method of claim 1, wherein the execution of the computer executable restoration instructions enables an unmanaged slice based disk to be converted to a managed ZFS disk.

7. The method of claim 1, further comprising providing an interface for manipulation of target configuration information to enable restoration to a target computing platform which is different from a computing platform associated with source configuration information.

8. The method of claim 7, wherein the manipulation of target configuration information enables the mapping between a dissimilar source configuration and target configuration including at least one of: mapping a mirrored configuration to an un-mirrored configuration, mapping a striped configuration to an unstriped configuration, mapping between different levels of RAID configurations, and mapping between a configuration with spare storage to a configuration without spare storage.

9. The method of claim 1, wherein modeling configuration information comprises parsing configuration information and a parsed configuration is represented as configuration objects.

10. The method of claim 9, wherein the configuration objects represent file system components stored in a hierarchical order.

11. The method of claim 10, wherein the hierarchal order of a model of file system objects in a source configuration facilitates the restoration of resources on a target computing platform.

12. The method of claim 11, wherein the hierarchical order of a model of file system objects in a source configuration enables a restoration program to traverse a hierarchical tree from lower level objects to higher level objects to generate executable code to restore a configuration.

13. The method of claim 1, further comprising performing error handling during the execution of restoration instructions.

14. The method of claim 1, further comprising storing one or more configurations.

15. At least one non-transitory processor readable storage medium for storing a computer program of instructions configured to be readable by at least one processor for instructing the at least one processor to execute a computer process for performing the method as recited in claim 1.

16. An article of manufacture for file system resource restoration, the article of manufacture comprising:
    at least one non-transitory processor readable storage medium; and
    instructions carried on the at least one storage medium;
    wherein the instructions are configured to be readable from the at least one storage medium by at least one processor and thereby cause the at least one processor to operate so as to:
        model source configuration information of one or more file system resources associated with a first storage management system;
        model target configuration information of one or more file system resources associated with a second storage management system;
        map one or more portions of the source configuration information to the target configuration information, wherein the first storage management system associated with the source configuration and the second storage management system associated with the target configuration are dissimilar;

generate computer executable restoration instructions based at least in part on the mapping; and execute the computer executable restoration instructions to restore one or more file system resources of the source configuration information to a target computing platform identified by the target configuration information.

17. A system for file system resource restoration comprising:

one or more processors communicatively coupled to a server; wherein the server is configured to:

model target configuration information of one or more file system resources associated with a second storage management system;

map one or more portions of source configuration information to the target configuration information, wherein a first storage management system associated with the source configuration and the second storage management system associated with the target configuration are dissimilar;

generate computer executable restoration instructions based at least in part on the mapping; and execute the computer executable restoration instructions to restore one or more file system resources of the source configuration information to a target computing platform identified by the target configuration information.

18. The system of claim 17, wherein the source configuration information and the target configuration information utilize dissimilar storage management systems.

19. The system of claim 18, wherein the source configuration information is associated with a Veritas Volume Manager and the target configuration information is associated with a different storage manager.

* * * * *